US012632440B2

(12) United States Patent
Han et al.

(10) Patent No.: US 12,632,440 B2
(45) Date of Patent: May 19, 2026

(54) METHOD AND DEVICE FOR DETECTING ANOMALY IN LOG DATA

(71) Applicant: POSTECH RESEARCH AND BUSINESS DEVELOPMENT FOUNDATION, Pohang-si (KR)

(72) Inventors: Wook-Shin Han, Pohang-si (KR); Sungho Park, Pohang-si (KR); Hyuk-Kyu Kang, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/935,330

(22) Filed: Nov. 1, 2024

(65) Prior Publication Data

US 2025/0147948 A1      May 8, 2025

Related U.S. Application Data

(60) Provisional application No. 63/610,344, filed on Dec. 14, 2023.

(30) Foreign Application Priority Data

Nov. 8, 2023    (KR) ........................ 10-2023-0153713
Sep. 2, 2024    (KR) ........................ 10-2024-0118853

(51) Int. Cl.
*G06F 16/23*          (2019.01)
(52) U.S. Cl.
CPC ................................. *G06F 16/2365* (2019.01)

(58) Field of Classification Search
None
See application file for complete search history.

(56) References Cited

U.S. PATENT DOCUMENTS

| | | | | |
|---|---|---|---|---|
| 2010/0161274 A1* | 6/2010 | Leao | .................. | G05B 23/0243 |
| | | | | 702/182 |
| 2014/0149806 A1* | 5/2014 | Khalastchi | ............ | G06F 11/008 |
| | | | | 714/49 |
| 2018/0046599 A1* | 2/2018 | Nagarajan | ................ | G06N 3/08 |
| 2018/0248904 A1* | 8/2018 | Villella | .................. | G06N 3/044 |
| 2020/0364579 A1* | 11/2020 | Misu | ...................... | G06N 3/084 |

(Continued)

OTHER PUBLICATIONS

Xu et al. "Anomaly Transformer: Time Series Anomaly Detection with Association Discrepancy". Published Oct. 2021. URL Link: <https://doi.org/10.48550/arXiv.2110.02642>. Accessed Aug. 2025. (Year: 2021).*

(Continued)

*Primary Examiner* — Irene Baker
(74) *Attorney, Agent, or Firm* — Morgan, Lewis & Bockius LLP

(57) ABSTRACT

The following disclosure relates to a method of detecting an anomaly in log data and includes obtaining first log data by collecting log data from a database and processing the log data in a time axis through a log data manager, reconstructing the first log data into second log data through a transformer, calculating an anomaly score of each time point through the transformer based on a difference between the first log data and the second log data, and detecting an anomaly for each time point through an anomaly detector based on the anomaly score.

17 Claims, 5 Drawing Sheets

(56)         References Cited

U.S. PATENT DOCUMENTS

| | | | |
|---|---|---|---|
| 2021/0397938 A1* | 12/2021 | Tora | G06N 3/08 |
| 2022/0155184 A1* | 5/2022 | Ravi | F04B 51/00 |
| 2022/0156578 A1* | 5/2022 | Allahdadian | G06F 17/18 |
| 2023/0206060 A1* | 6/2023 | Lukens | H04L 41/064 |
| | | | 706/20 |
| 2024/0281359 A1* | 8/2024 | White | G06F 11/3409 |
| 2025/0175379 A1* | 5/2025 | Farrell | H04L 41/16 |

OTHER PUBLICATIONS

Xu, Jiehui. "Anomaly transformer: Time series anomaly detection with association discrepancy." arXiv preprint arXiv:2110.02642 (2021).
Yoon, Dong Young, Ning Niu, and Barzan Mozafari. "Dbsherlock: A performance diagnostic tool for transactional databases." Proceedings of the 2016 international conference on management of data. 2016.
Bailis, Peter, et al. "Macrobase: Prioritizing attention in fast data." Proceedings of the 2017 ACM International Conference on Management of Data. 2017.
Office Action dated Dec. 23, 2025 issued in corresponding Korean Patent Application No. 10-2024-0118853. (Note: U.S. Pat. No. 20200364579 A1, U.S. Pat. No. 20180248904 A1 and U.S. Pat. No. 20230206060 A1 already cited.).

* cited by examiner

METHOD AND DEVICE FOR DETECTING ANOMALY IN LOG DATA

CROSS-REFERENCE TO RELATED APPLICATIONS

This application claims the benefit of and priority to Korean Patent Application No. 10-2023-0153713 filed on Nov. 8, 2023, U.S. Provisional Application No. 63/610,344 filed on Dec. 14, 2023, and Korean Patent Application No. 10-2024-0118853 filed on Sep. 2, 2024, the entire contents of all of which are incorporated herein by reference for all purposes.

BACKGROUND

1. Field of the Invention

The embodiments relate to a method and device for detecting an anomaly in log data.

2. Description of the Related Art

When performance anomalies occur, a database administrator may need to analyze a vast amount of log data generated by various sources, such as log data management and a database management system (DBMS) through a log analysis interface and find the cause of the performance anomalies. However, since the causes of performance anomalies in an existing database system are significantly diverse including resource saturation, such as a disk, an input/output, a CPU, and a network, incorrect database environment settings, and incorrect database physical design, an analysis may be required through various trial-and-error after establishing a hypothesis for the cause. This process may require a lot of time and effort from a highly specialized administrator, and thereby, the cost may be high. Accordingly, there is a need for a technique to automatically notify the database administrator and analyze the cause.

SUMMARY

A method of detecting an anomaly of log data according to an embodiment may include obtaining first log data by collecting log data from a database and processing the log data in a time axis through a log data manager, reconstructing the first log data into second log data through a transformer, calculating an anomaly score of each time point through the transformer based on a difference between the first log data and the second log data, and detecting an anomaly for each time point through an anomaly detector based on the anomaly score.

The calculating of the anomaly score of each time point may include quantifying the anomaly score for each time point.

The method may further include a method of correcting the anomaly score through an anomaly score integrator using a statistical method.

The anomaly score integrator may be configured to reduce dimensions of the first log data to major dimensions using a principal component analysis to extract a main feature of the first log data.

The anomaly score integrator may be configured to obtain a Mahalanobis distance by obtaining a mean and a covariance of the major dimensions of the first log data and correct the anomaly score based on the Mahalanobis distance.

The method may further include classifying a cause of the detected anomaly through an anomaly cause classifier.

The detecting of the anomaly may include dynamically setting a threshold value according to a feature of the log data, and determining an anomaly based on the threshold value.

The setting of the threshold value may include adjusting at least one of a weight parameter, the number of major dimensions, and a percentile.

For each time point of the first log data, the transformer may be trained to identify association between each time point and peripheral time points.

The transformer may be trained to reconstruct the first log data into the second log data based on the association.

At each time point, the transformer may be trained to calculate an anomaly score based on a difference between the first log data and the second log data and an association discrepancy of each time point of the second log data with peripheral time points.

An electronic device may include a memory configured to store instructions, and at least one processor, wherein the instructions, when executed by the at least one processor, may cause the electronic device to obtain first log data by collecting log data from a database and processing the log data in a time axis through a log data manager, for each time point of the first log data, reconstruct the first log data into second log data through a transformer, based on peripheral time points of each time point, calculate an anomaly score of each time point through the transformer based on a difference between the first log data and the second log data, and detect an anomaly for each time point through an anomaly detector based on the anomaly score.

The instructions, when executed by the at least one processor, may cause the electronic device to quantify the anomaly score for each time point.

The instructions, when executed by the at least one processor, may cause the electronic device to correct the anomaly score through an anomaly score integrator using a statistical method.

The anomaly score integrator may be configured to reduce dimensions of the first log data to major dimensions using a principal component analysis to extract a main feature of the first log data.

The anomaly score integrator may be configured to obtain a Mahalanobis distance by obtaining a mean and a covariance of the major dimensions of the first log data and correct the anomaly score based on the Mahalanobis distance.

The instructions, when executed by the at least one processor, may cause the electronic device to classify a cause of the detected anomaly through an anomaly cause classifier.

The instructions, when executed by the at least one processor, may cause the electronic device to dynamically set a threshold value according to a feature of the log data, and determine an anomaly based on the threshold value.

The instructions, when executed by the at least one processor, may cause the electronic device to adjust at least one of a weight parameter, the number of major dimensions, and a percentile.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
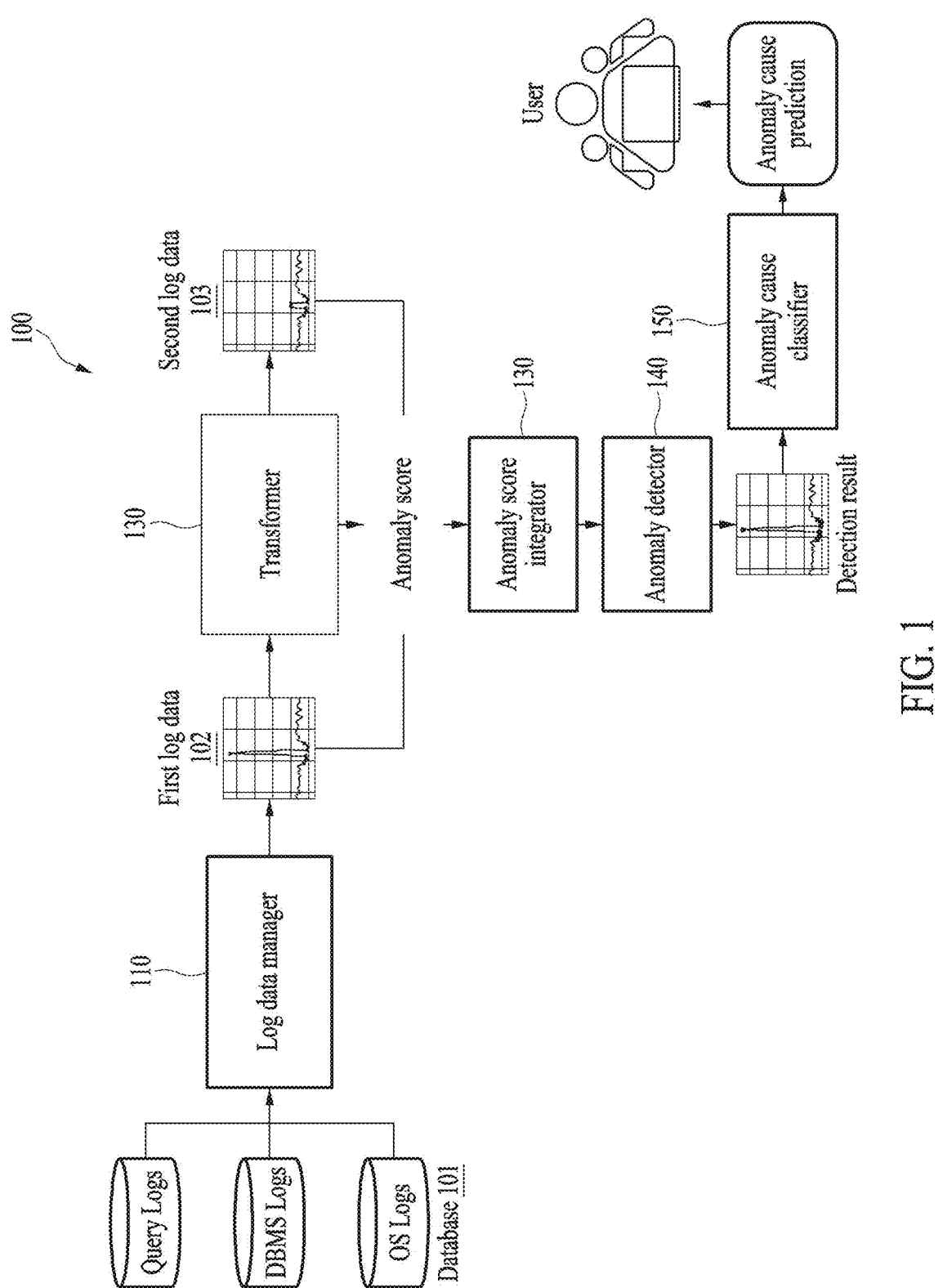
FIG. 1 is a schematic block diagram illustrating a device for detecting a log data anomaly according to an embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a schematic block diagram illustrating a device for detecting a log data anomaly according to an embodiment.

As illustrated in FIG. 1, one or more blocks and a combination thereof may be implemented by a special-purpose hardware-based computer that performs a predetermined function or a combination of computer instructions and special-purpose hardware. Additionally, for ease of description, a log data anomaly detection device 100 may be referred to as an electronic device 500 shown in FIG. 5.

The log data may be data that records various events, tasks, and state changes occurring in a computer system, a server, an application, and a network device. The log data may provide information for normal operation, troubleshooting, performance monitoring, and security analysis of the system.

Referring to FIG. 1, the log data anomaly detection device 100 according to an embodiment may collect log data from a database 101 through a log data manager 110, may sort and process the collected log data in a time axis, and may generate first log data 102. The log data anomaly detection device 100 may reconstruct second log data 103 from the first log data 102 through a transformer 120 that learns the correlation of time series data. The log data anomaly detection device 100 may output a final anomaly score by correcting an anomaly score calculated by the transformer 120 using an anomaly score integrator 130. The log data anomaly detection device 100 may output an anomaly point detection result from the final anomaly score using an anomaly detector 140. In addition, the log data anomaly detection device 100 may analyze and classify a cause of the anomaly through an anomaly cause classifier 150. The description of FIG. 1 is further described with reference to FIG. 2 below.

Figure 2:
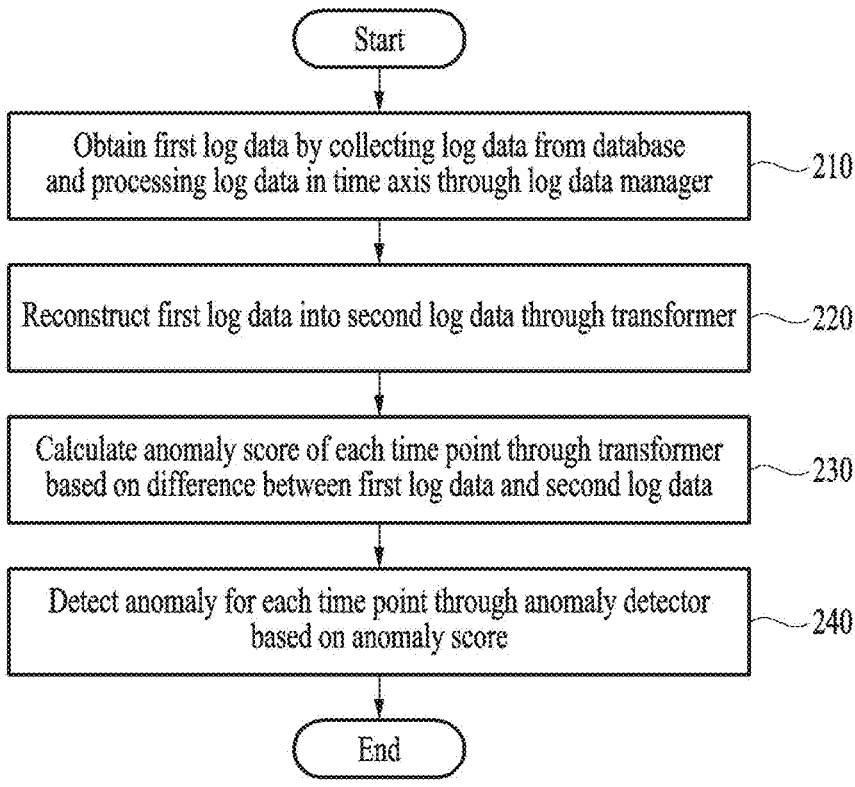
FIG. 2 is a flowchart illustrating a method of detecting a log data anomaly according to an embodiment.

FIG. 2 is a flowchart illustrating a method of detecting a log data anomaly according to an embodiment.

The description provided with reference to FIG. 1 may apply to FIG. 2, and any repeated description related thereto may be omitted.

Operations of FIG. 2 may be performed in the shown order and manner. However, the order of some operations may change or some operations may be omitted, without departing from the spirit and scope of the shown embodiment. The operations shown in FIG. 2 may be performed in parallel or simultaneously.

Figure 5:
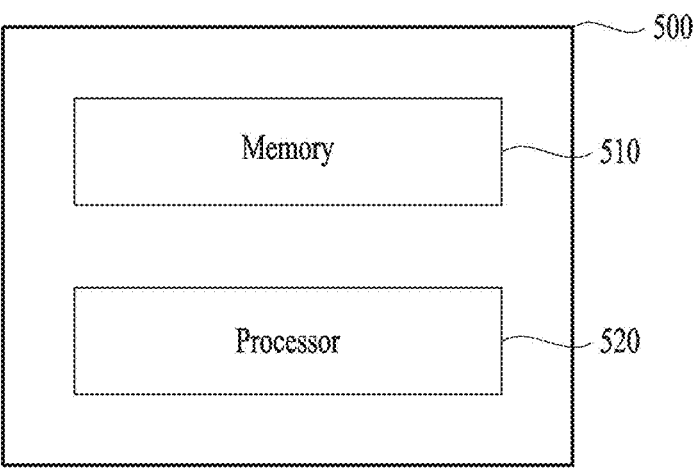
FIG. 5 is a block diagram of an electronic device according to an embodiment.

For ease of description, it is described that operations 210 to 240 are performed using the electronic device 500 shown in FIG. 5 (or the log data anomaly detection device 100 shown in FIG. 1). However, operations 210 to 240 may be performed by another suitable electronic device in a suitable system.

In operation 210, the electronic device 500 may obtain the first log data 102 by collecting log data from the database 101 and processing the log data in the time axis through the log data manager 110. The database 101 may be various sources including the log data. For example, the database 101 may be the database 101 including query logs, DBMS logs, and operating system (OS) logs. The log data manager 110 may collect log data for time points in the log data and may sort and process the log data in the same time axis.

In operation 220, the electronic device 500 may reconstruct the first log data 102 into the second log data 103 through the transformer 120. For each of time points of the first log data 102, the transformer 120 may be trained to identify the association between each time point and peripheral time points. The transformer 120 may be trained to reconstruct the first log data 102 to the second log data 103 based on the association.

The transformer 120 may understand an overall pattern of input time series data and may reconstruct the first log data 102 to the second log data 103 based on a relationship of each time point with other time points.

The transformer 120 may be a deep learning model that models a complex interrelationship between time points in time series data. The transformer 120 may learn how each time point is associated with other time points through a self-attention mechanism.

The input data of each time point may be converted into query (Q), key (K), and value (V) vectors, and the transformer 120 may calculate the association between time points through the query, key, and value. The transformer 120 may calculate an association weight of each time point through self-attention and may identify a relationship between time points based on the weight. The transformer 120 may obtain a weight by calculating a dot product between a query vector at a specific time point and a key vector at a different time point. The transformer 120 may normalize the weight obtained by dot product calculation using a softmax function, and through this, may perform a probabilistic analysis on the degree of association of the specific time point with other time points.

The transformer 120 may be trained to understand the relationship of each time point with other time points of the first log data 102. In this process, the transformer 120 may learn series association of each time point with other time points using the self-attention mechanism. The association may indicate a position of a given time point in the entire time series data.

In operation 230, the electronic device 500 may calculate an anomaly score of each time point through the transformer 120 based on a difference between the first log data 102 and the second log data 103.

The transformer 120 may be trained to calculate the anomaly score based on the difference between the first log data 102 in each time point and the second log data 103 and the association discrepancy of each time point of the second log data 103 with peripheral time points.

The anomaly score may be a score calculated based on a reconstruction result of the first log data 102, which is the time series log data, by the transformer 120. The anomaly score may be used to distinguish a normal pattern from an abnormal pattern in the input time series data. The transformer 120 may learn the association between time points in the input time series log data and may calculate the anomaly score by reflecting a feature that in the case of abnormal data points, the association with peripheral time points is likely to be different from the normal pattern.

The transformer 120 may generate the second log data 103 based on the first log data 102. The second log data 103 may be data generated by reflecting the time series pattern that the transformer 120 learns. Accordingly, the transformer 120 may obtain the difference between the first log data 102 and the second log data 103, and may use the difference at each time point for the anomaly score calculation.

The transformer 120 may use the anomaly score for the calculation by comparing prior association with series association. The prior association may reflect a natural association between adjacent time points, whereas the series association may indicate a relationship between the entire time series data that the transformer 120 learns. Accordingly, the transformer 120 may measure how much the specific time point deviates from the normal pattern and may use the measurement result for the anomaly score calculation, based on the discrepancy (association discrepancy) between two associations.

The association discrepancy may be a difference between the prior association and the series association of the specific time point, and as the difference increases, the probability that the corresponding time point is an anomaly may increase. On the other hand, as the difference decreases, the probability that the corresponding time point is an anomaly may decrease.

The prior association may be the association of each time point with adjacent time points. Since the adjacent time points are highly likely to have the high association, in the normal time series data, the transformer 120 may learn a natural pattern between the specific time point and an adjacent time point.

The series association may be reflecting the association of the specific time point with the entire time series data. Accordingly, in the normal time series data, the transformer 120 may learn the association of the specific time point with the entire time points.

The transformer 120 may calculate the association discrepancy using Equation 1 below.

$$AssDis(P, S; X) = \left[ \frac{1}{L} \sum_{i=1}^{L} \left( KL\left(P_{i,:}^l \| S_{i,:}^l\right) + KL\left(S_{i,:}^l \| P_{i,:}^l\right) \right) \right]_{i=1,\dots,N} \quad \text{[Equation 1]}$$

In Equation 1, AssDis(P, S; X) may be an association discrepancy and may denote a difference between a prior association P and a series association S. $X \in \mathbb{R}^{N \times d}$ may be N×d-dimensional log data, N may be the number of time points, and d may be a feature dimension of each time point. L may denote the number of layers of the transformer 120. KL(‖) may denote a distribution difference between the prior association P and the series association S in the l-th layer.

$$P_{i,:}^l$$

may denote the i-th prior association in the l-th layer and $$S_{i,:}^l$$

may denote the i-th series association in the l-th layer.

The transformer 120 may distinguish a normal pattern from an abnormal pattern at each time point through Equation 1 and may use the patterns for the anomaly score calculation.

The transformer 120 may calculate the anomaly score based on the difference and association discrepancy between the first log data 102 and the second log data 103 through Equation 2 below.

$$AnomalyScore(X) = \quad \text{[Equation 2]}$$

$$softmax(-AssDis(P, S; X)) \odot \left[ \left\| X_{i,:} - \hat{X}_{i,:} \right\|_2^2 \right]_{i=1,\dots,N}$$

In Equation 2, $$\|X_{i,:} - \hat{X}_{i,:}\|_2^2$$

may denote a reconstruction error (e.g., a difference at each time point of the first log data 102 and the second log data 103), and may be a Euclidean distance at each time point of the first log data 102 X and the second log data 103 $\hat{X}$.

The electronic device 500 according to an embodiment may quantify the anomaly score for each time point.

The electronic device 500 according to an embodiment may correct the anomaly score through the anomaly score integrator 130 using a statistical method.

The statistical method may be a method used for evaluating how far each time point is from the center of the overall distribution based on an assumption that the log data follows a normal distribution. The statistical method may be used to identify an abnormal anomaly in the log data.

The anomaly score integrator 130 may reduce the dimension of the first log data 102 to a major dimension using a principal components analysis (PCA) to extract a major feature of the first log data 102. For example, the anomaly score integrator 130 may reduce normal time points of 200 dimensions consisting of 200 pieces of log data to M major dimensions using the PCA to remove information that does not help anomaly identification in the log data. Thereafter, the anomaly score integrator 130 may calculate a mean and a covariance for M major dimensions.

The anomaly score integrator 130 may obtain a Mahalanobis distance by obtaining the mean and covariance of the major dimensions of the first log data 102 and may correct the anomaly score based on the Mahalanobis distance. The Mahalanobis distance may indicate how much each time point deviates from the normal distribution, and through this, the anomaly score may be corrected.

The Mahalanobis distance may be obtained by measuring a distance between points by considering data distribution, and may be a significantly useful statistical tool when evaluating the similarity between data. A typical Euclidean distance may calculate a straight line distance between two points, but the Mahalanobis distance may calculate a distance value by considering the data distribution (in other words, a covariance matrix). Due to this, the Mahalanobis distance may measure a more accurate distance by reflecting the correlation between variables.

The Mahalanobis distance may calculate the distance by considering a data distribution feature. In other words, the Mahalanobis distance may reflect the distribution of data in a specific axis (variable). For example, when the data is distributed in a specific direction, The Mahalanobis distance may be less sensitive to the distance calculation in the specific direction.

The Mahalanobis distance may reflect the correlation between variables. When the variables correlate, the relationship may be reflected in the covariance matrix, and due to this, the distance between correlated variables may be accurately calculated.

The Mahalanobis distance may be calculated by standardizing the variability of each data point, and thereby, may provide relatively consistent distance measurement when the data has different units or scales.

The Mahalanobis distance may be used as a criterion to determine data that deviates from the mean to be an anomaly in the anomaly detection. The Mahalanobis distance may indicate that a data point far from the mean is highly likely to be an anomaly compared to a normal point in a cluster.

The electronic device 500 according to an embodiment may correct the anomaly score using the Mahalanobis distance together with the anomaly score calculated by a transformer 120 model. After reducing the major dimension of the log data through the PCA, the degree of deviation of the log data of each time point from the normal distribution may be evaluated by calculating the Mahalanobis distance in the corresponding dimension. The correction process may more precisely identify an anomaly than simply relying on a reconstruction error. Through a statistical approach using the Mahalanobis distance, the electronic device 500 may detect an anomaly change occurring in the log data by reflecting a feature of the data distribution. The Mahalanobis distance may be expressed as Equation 3 below.

$$\text{Distance}(x; \text{Stats}) = \sqrt{(x - \mu)^T C^{-1}(x - \mu)} \qquad \text{[Equation 3]}$$

In this case, x may be a specific time point expressed as a d-dimensional vector, $\mu$ may denote a mean, and C may denote a covariance matrix. Lastly, the electronic device 500 may calculate a final anomaly score by combining the anomaly score calculated by the transformer 120 with the mahalonobis distance. The final anomaly score combined in this process may be expressed as Equation 4 below.

$$IntegratedAnomalyScore(X) = \qquad \text{[Equation 4]}$$
$$AnomalyScore(X) + \lambda \times \text{Distances}(X; \text{Stats})$$

In this case, $\lambda$ may be a weight parameter that adjusts a weight between a reconstruction error and a Mahalanobis distance. The combined anomaly score as shown in Equation 4 may reflect an anomaly of each time point and may be used for detecting an anomaly state of the log data.

In operation 240, the electronic device 500 may detect an anomaly of each time point through the anomaly detector 140 based on an anomaly score (e.g., the final anomaly score of Equation 4). The electronic device 500 according to an embodiment may dynamically set a threshold value according to the feature of the log data and may determine an anomaly based on the threshold value.

The anomaly detector 140 according to an embodiment may calculate an optimal threshold value by analyzing a distribution of a validation dataset based on the anomaly score calculated at each time point. The validation dataset may be data used to evaluate the performance of the system in advance and may use an F1 score to evaluate the anomaly detection performance of the data. The F1 score may be a harmonic mean of precision and recall and may be used to comprehensively evaluate the performance of the anomaly detection system.

The electronic device 500 according to an embodiment may adjust at least one of a weight parameter, the number of major dimensions M, and a percentile when setting the threshold value.

The percentile may be a specific percentile in the data distribution and may be used to determine what percentage of the data from the top is an anomaly through the anomaly score. For example, the 95th percentile may represent that the top 5% of data is determined to be an anomaly. The electronic device 500 may search for the optimal threshold value by changing the percentile value from 95th to 99th in a preset unit (e.g., 0.1 units).

The weight parameter (lambda, λ) may be a parameter that adjusts a weight between a reconstruction error and a statistical distance, and the sensitivity of the anomaly detector 140 may be adjusted according to the weight parameter. The electronic device 500 may derive the optimal performance by adjusting a weight parameter value in a preset range (e.g., from 0.01 to 0.05). For example, as the weight parameter value increases, a greater weight may be assigned to the statistical distance, and due to this, a criterion for anomaly detection may change.

The number of major dimensions may be the number of major dimensions selected during a PCA process. The PCA may be an analysis that removes noise while maintaining main features of the data by reducing high-dimensional data of the log data to low-dimensional data. The electronic device 500 may optimize the performance of the anomaly detector 140 by adjusting an M value in a preset range of the number of dimensions (e.g., from 1 to 10). For example, when specific log data is 200 dimensions, the anomaly detector 140 may detect an anomaly by reducing the number of dimensions to a major dimension through the PCA.

The anomaly detector 140 may measure an F1 score by dynamically adjusting the percentile, the weight parameter, and the number of major dimensions. For example, in an experiment using a DBSherlock dataset, an F1 score may be optimized by applying different percentiles and weight parameters to workloads, such as transaction processing performance council-C (TPC-C) and TPC-E. The TPC-C and TPC-E may be benchmark standards used to measure the performance of a database. The benchmarks may be used to evaluate the performance of a DBMS or a transaction processing system.

In the TPC-C workload, when the percentile is set to 96.3% and the weight parameter is set to 0.03, the F1 score may be optimized to 0.9607. In the TPC-E workload, when the percentile is set to 96.5% and the weight parameter is set to 0.04, the F1 score may be optimized to 0.9634. The electronic device 500 may maximize the anomaly detection performance by dynamically setting an optimal parameter in various log data environments.

The electronic device 500 according to an embodiment may classify a cause of a detected anomaly through an anomaly cause classifier 150. The anomaly cause classifier 150 may analyze and predict a root cause of the performance degradation occurring after anomaly detection using a neural network-based classifier layer added to the top of the transformer 120. The anomaly cause classifier 150 may learn and predict a root cause of an anomaly by receiving anomaly data provided by the anomaly detector. In this process, the neural network may be combined with an existing trained loss function and may classify a cause of a detected anomaly. A representative loss function used in a training process of the classifier may be cross-entropy loss, and the cross-entropy loss may be used to minimize a difference between a predicted anomaly cause and a real cause. Through this, the anomaly cause classifier 150 may output the most appropriate cause category for each anomaly.

For example, in an experiment using the DBSherlock dataset, the anomaly cause classifier 150 may predict an anomaly cause with an accuracy of 94.85% in the TPC-C workload and an accuracy of 97.11% in the TPC-E workload. The result may provide an accurate and reliable causal analysis of the detected anomaly to assist a system administrator with rapidly solving a problem.

Figure 3:
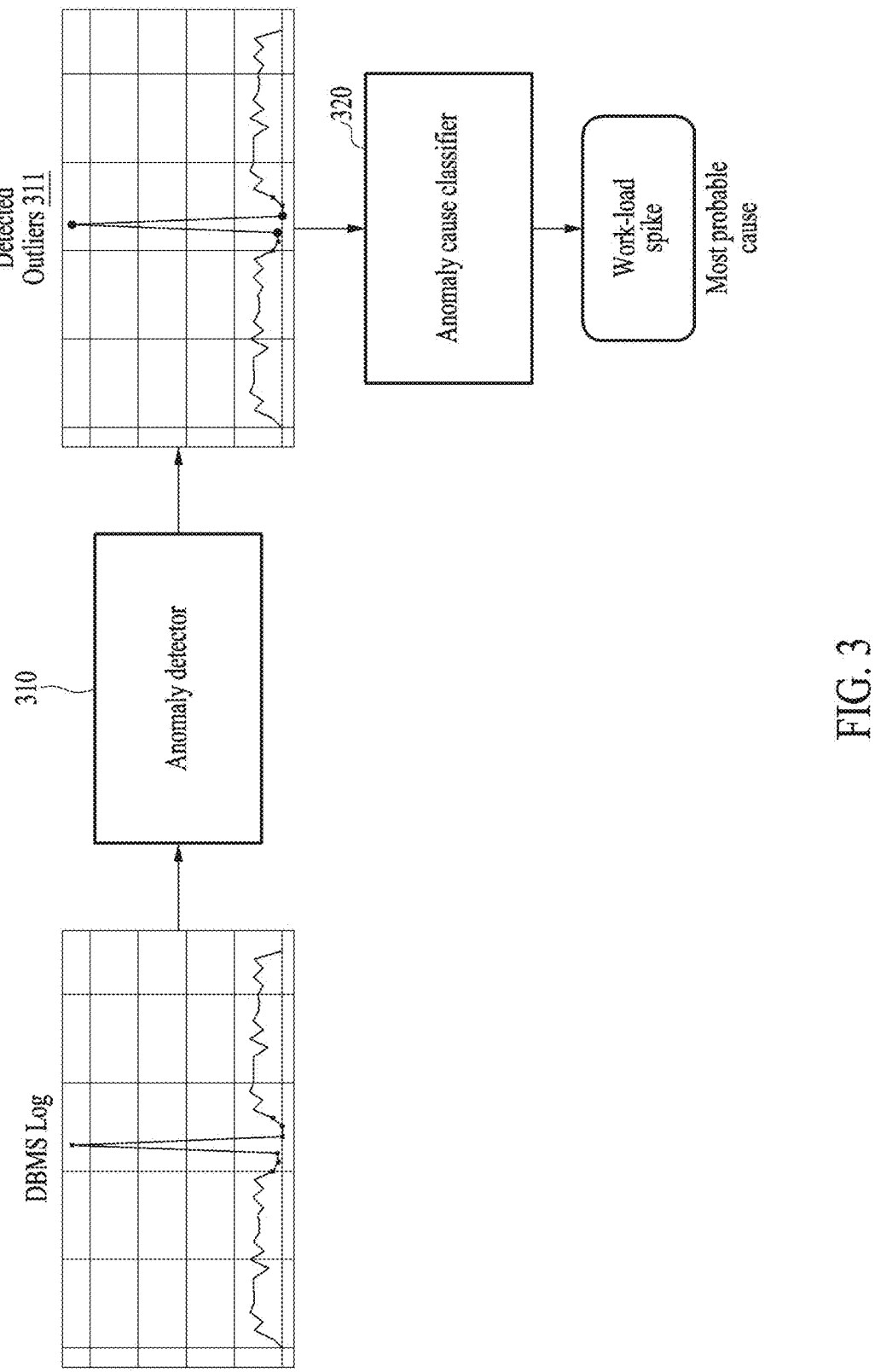
FIG. 3 is a diagram illustrating an example of a process of detecting an anomaly in log data and classifying a cause of the detected anomaly according to an embodiment.

FIG. 3 is a diagram illustrating an example of a process of detecting an anomaly in log data and classifying a cause of the detected anomaly according to an embodiment.

The description provided with reference to FIGS. 1 and 2 may apply to FIG. 3, and any repeated description related thereto may be omitted.

Referring to FIG. 3, the electronic device 500 may receive DBMS log data as input data. The DBMS log data may be log data including various transaction records, performance metrics, and error messages occurring in a DBMS. For example, the electronic device 500 may predict a system performance anomaly with data including a sudden increase of transaction requests or a rapid increase of query response time at a specific time point, through the DBMS log data.

An anomaly score may be assigned to the DBMS log data through the transformer as described with reference to FIGS. 1 and 2 above and the DBMS log data may be transmitted to an anomaly detector 310 (e.g., the anomaly detector 140 of FIG. 1). A transformer-based model that learns a pattern of time series data may calculate an anomaly score for each time point by distinguishing a normal pattern from an abnormal pattern in the input log data. The transformer may learn a relationship of each time point with other time points through the self-attention mechanism and may assign an anomaly score to distinguish normal data from abnormal data.

The transformer according to an embodiment may learn the association between time points occurring in the log data and may detect a data point that deviates from a normal time series pattern as an anomaly. The transformer may measure an association difference between normal time series data and abnormal data by calculating an association discrepancy. In the normal log data, adjacent time points may show a strong association, but in the abnormal data, the association may be weakened or an irregular pattern may be shown. Based on the discrepancy, the transformer may calculate an anomaly score for each time point, and based on this, the transformer may assign an anomaly score to detect an abnormal point.

The association discrepancy may be a criterion for measuring an association difference between a normal time series pattern and an abnormal pattern. The normal time series data may have a strong association between time points, whereas the abnormal data may have a weak or irregular association. Through the association discrepancy, the probability that the data at a specific time point is abnormal may be assessed. The transformer may calculate an anomaly score through a difference between two values by calculating prior association and series association.

A graph 311 may visually show detected outliers (an anomaly detection result) detected by the anomaly detector 310. In the graph 311, an occurrence of a rapid change at a specific time point may be identified and this change may be regarded as a system anomaly. Points highlighted in red may be abnormal data points, and high anomaly scores may be assigned to the points.

The anomaly detector 310 may dynamically adjust the percentile, the weight parameter, and the number of major dimensions to optimize the F1 score. The percentile may determine what percentage of the data from the top is an anomaly and the weight parameter may adjust a ratio between a reconstruction error and a statistical distance. The number of major dimensions may be dimensions selected through a PCA and may be used to remove noise while maintaining a main feature of the data.

Thereafter, the detected anomaly may be transmitted to an anomaly cause classifier 320 (e.g., the anomaly cause classifier 150 of FIG. 1). The anomaly cause classifier 320 may analyze and predict a cause of a detected anomaly using a neural network-based classifier layer at the top of the transformer. The anomaly cause classifier 320 may enhance the classification accuracy using a loss function, such as cross-entropy loss, for the detected anomaly data. The anomaly cause classifier 320 may classify the detected anomaly data into various cause categories and may predict and output the most probable cause. For example, the anomaly cause classifier 320 may output that "workload spike" is predicted with the highest probability as the cause of the detected anomaly in the graph 311. The workload spike may be the probability that the system performance is degraded due to a rapid increase in transaction requests at a specific time point.

The anomaly detection and causal analysis process may consider a time series feature of the log data, may accurately detect an anomaly state of the system performance, and may contribute to rapidly identifying the cause of the anomaly state. The detected anomaly and the causal analysis result may be provided to a system administrator and may provide important information for troubleshooting.

Figure 4:
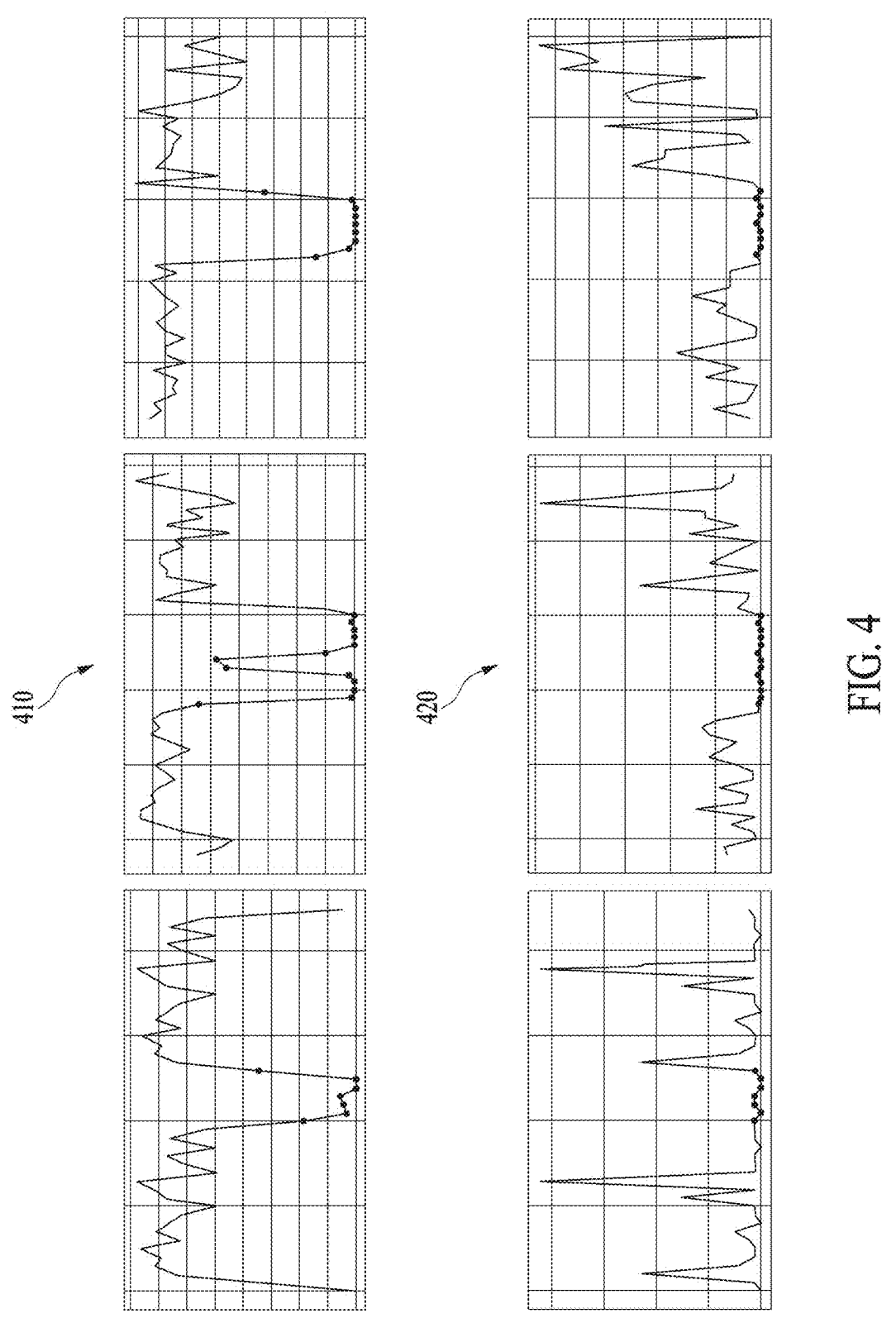
FIG. 4 is a schematic example of log data including an anomaly according to an embodiment.

FIG. 4 is a schematic example of log data including an anomaly according to an embodiment.

The description provided with reference to FIGS. 1 to 3 may apply to FIG. 4, and any repeated description related thereto may be omitted.

Referring to FIG. 4, a graph 410 and a graph 420 may be examples of showing log data that a user is able to intuitively determine and log data that is difficult to intuitively determine by the user during the anomaly detection of log data. The graphs 410 and 420 may show a change pattern of the log data shown in a specific time range.

In the graph 410, a user may view a pattern in which a value rapidly decreases in an anomaly range. The rapid change may correspond to a case in which an anomaly is clearly determined when the user visually identifies. For example, a sudden transaction decrease in the database performance or a sharp decline of a specific performance metric may typically represent an abnormal state of the system, and the change may be recognized as an intuitive anomaly.

On the other hand, in the graph 420, since a pattern of an anomaly range is unclear, it may be difficult for the user to determine the anomaly. In this case, the user may have a difficulty in clear anomaly detection because a change in the data is not significant or a pattern is inconsistent. For example, subtle performance degradation or a small change may occur in a portion of the system, but the change may also occur within a normal range. Therefore, it may be difficult to visually distinguish the change.

In conclusion, the graphs 410 and 420 may represent the need for an anomaly detection system. As shown in the graph 410, when a clear anomaly exists, the user may easily determine. However, in an unclear pattern as shown in the graph 420, an automated detection system may play a key role. The transformer-based anomaly detection system may be trained to distinguish a normal pattern from an abnormal pattern even in the unclear pattern, and thereby, may detect an anomaly that is difficult for the user to recognize.

FIG. 5 is a block diagram of an electronic device according to an embodiment.

In FIG. 5, one or more blocks and a combination thereof may be implemented by a special-purpose hardware-based computer that performs a predetermined function, or a combination of computer instructions and special-purpose hardware. The description provided with reference to FIGS. 1 to 4 may also apply to FIG. 5. For example, the electronic device 500 (e.g., a central server 200) according to an embodiment may include a federated learning MLOps system 100.

As shown in FIG. 5, the electronic device 500 may include a memory 510 and a processor 520. The electronic device 500 may further include a communication module, and the communication module may include a transmitter and a receiver.

The electronic device 500 according to an embodiment may include the memory 510 and the processor 520 connected to the memory 510 via a system bus or another appropriate circuit.

The electronic device 500 may store program code in the memory 510. The memory 510, according to an embodiment, may include a local memory or at least one physical memory device, such as at least one bulk storage device. Here, the local memory may include a random access memory (RAM) or other volatile memory devices generally used during actual execution of the program code. The bulk storage device may be implemented as a hard disk drive (HDD), a solid-state drive (SSD), or other non-volatile memory devices.

In response to the executable program code stored in the memory 510 being executed by the electronic device 500, the processor 520 may perform various operations disclosed herein. For example, the memory 510 may store the program code such that the processor 520 may perform at least one operation described with reference to FIGS. 1 to 4.

Depending on the type of apparatus to be implemented, the electronic device 500 may include components less than the number of the illustrated components or may include additional components that are not illustrated in FIG. 5. Also, at least one component may be included in another component and may constitute a portion of the other component.

The processor 520, according to an embodiment, is a hardware configuration that performs overall control functions for controlling operations of the electronic device 500. For example, the processor 520 may generally control the electronic device 500 by executing programs stored in the memory 510 in the electronic device 500. The processor 520 may be implemented as a central processing unit (CPU), a graphics processing unit (GPU), an application processor (AP), a neural processing unit (NPU), and the like, which are included in the electronic device 500, but examples are not limited thereto.

The processor 520 may collect log data from a database, may obtain first log data by processing the log data in a time axis through a log data manager, may reconstruct the first log data into second log data through a transformer based on peripheral time points of each time point of the first log data, may calculate an anomaly score of each time point through the transformer based on a difference between the first log data and the second log data, and may detect an anomaly for each time point through an anomaly detector based on the anomaly score.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of detecting an anomaly of log data, the method comprising:
   obtaining, by a log data manager executed by one or more processors, first log data by collecting log data from a database and sorting and processing the log data in a time axis,
   reconstructing, by a transformer executed by the one or more processors, the first log data into second log data, wherein, for each time point of the first log data, the transformer is trained to identify an association between each time point and peripheral time points and reconstruct the first log data into the second log data based on the association;
   calculating, by the transformer executed by the one or more processors, an anomaly score of each time point based on a difference between the first log data and the second log data and an association discrepancy of each time point of the second log data with peripheral time points; and
   detecting, an anomaly detector executed by the one or more processors, an anomaly for each time point based on the anomaly score,
   wherein the association discrepancy is calculated based on a difference between a prior association reflecting an association between adjacent time points and a series association reflecting an association of a specific time point with entire time series data that the transformer learns.

2. The method of claim 1, wherein the calculating of the anomaly score of each time point comprises:
   quantifying the anomaly score for each time point.

3. The method of claim 1, further comprising:
   combining, by an anomaly score integrator executed by the one or more processors, the anomaly score calculated by the transformer with a statistical distance using a statistical method to generate a final anomaly score.

4. The method of claim 3, wherein the anomaly score integrator is configured to:
   reduce dimensions of the first log data to major dimensions using a principal component analysis to extract a main feature of the first log data.

5. The method of claim 4, wherein the anomaly score integrator is configured to:
   obtain a Mahalanobis distance by obtaining a mean and a covariance of the major dimensions of the first log data and combine the anomaly score calculated by the transformer with the obtained Mahalanobis distance to generate the final anomaly score.

6. The method of claim 1, further comprising:
   classifying, by an anomaly cause classifier executed by the one or more processors, a cause of the detected anomaly.

7. The method of claim 1, wherein the detecting of the anomaly comprises:
   dynamically setting a threshold value according to a feature of the log data; and
   determining an anomaly based on the threshold value.

8. The method of claim 7, wherein the dynamically setting of the threshold value comprises:
   adjusting at least one of a weight parameter, the number of major dimensions, and a percentile to determine an optimal threshold value.

9. A non-transitory computer-readable storage medium storing instructions that, when executed by a processor, cause the processor to perform the method of claim 1.

10. An electronic device, comprising:

a memory configured to store instructions; and at least one processor, wherein the instructions, when executed by the at least one processor, cause the electronic device to:

obtain first log data by collecting log data from a database and sorting and processing the log data in a time axis through a log data manager;

reconstruct the first log data into second log data through a transformer, based on peripheral time points of each time point, wherein, for each time point of the first log data, the transformer is trained to identify an association between each time point and peripheral time points and reconstruct the first log data into the second log data based on the association;

calculate an anomaly score of each time point through the transformer based on a difference between the first log data and the second log data and an association discrepancy of each time point of the second log data with peripheral time points; and detect an anomaly for each time point through an anomaly detector based on the anomaly score, wherein the association discrepancy is calculated based on a difference between a prior association reflecting an association between adjacent time points and a series association reflecting an association of a specific time point with entire time series data that the transformer learns.

11. The electronic device of claim 10, wherein the instructions, when executed by the at least one processor, cause the electronic device to:

quantify the anomaly score for each time point.

12. The electronic device of claim 10, wherein the instructions, when executed by the at least one processor, cause the electronic device to:

combine the anomaly score calculated by the transformer with a statistical distance through an anomaly score integrator using a statistical method to generate a final anomaly score.

13. The electronic device of claim 12, wherein the anomaly score integrator is configured to:

reduce dimensions of the first log data to major dimensions using a principal component analysis to extract a main feature of the first log data.

14. The electronic device of claim 13, wherein the anomaly score integrator is configured to:

obtain a Mahalanobis distance by obtaining a mean and a covariance of the major dimensions of the first log data and combine the anomaly score calculated by the transformer with the obtained Mahalanobis distance to generate the final anomaly score.

15. The electronic device of claim 10, wherein the instructions, when executed by the at least one processor, cause the electronic device to:

classify a cause of the detected anomaly through an anomaly cause classifier.

16. The electronic device of claim 10, wherein the instructions, when executed by the at least one processor, cause the electronic device to:

dynamically set a threshold value according to a feature of the log data, and determine an anomaly based on the threshold value.

17. The electronic device of claim 16, wherein the instructions, when executed by the at least one processor, cause the electronic device to:

adjust at least one of a weight parameter, the number of major dimensions, and a percentile to determine an optimal threshold value.

* * * * *